United States Patent [19]

Frias

[11] 4,439,091
[45] Mar. 27, 1984

[54] PIPE FEEDING SYSTEM

[75] Inventor: Robert Frias, Odessa, Tex.

[73] Assignee: Ingram Corporation, New Orleans, La.

[21] Appl. No.: 125,160

[22] Filed: Feb. 27, 1980

[51] Int. Cl.³ .......................................... E21B 19/04
[52] U.S. Cl. .................................... 414/745; 175/85; 198/863; 211/60 S; 414/22; 414/89; 414/119; 414/124; 414/277
[58] Field of Search ............. 414/398, 22, 745, 747, 414/748, 114, 119, 124, 585, 573, 572, 400, 89, 280, 911, 277, 390, 395; 175/52, 85; 211/60 S; 198/592, 863, 865

[56] References Cited

U.S. PATENT DOCUMENTS

| | | | |
|---|---|---|---|
| 611,167 | 9/1898 | Bodley | 414/395 X |
| 2,647,647 | 8/1953 | Alimanestiano | 414/785 |
| 3,083,842 | 4/1963 | Bauer et al. | 414/22 |
| 3,146,539 | 9/1964 | Speno et al. | 198/865 X |
| 3,406,846 | 10/1968 | O'Connor | 414/267 |
| 3,616,941 | 11/1971 | Walling | 414/22 |
| 3,630,392 | 12/1971 | Cintract | 414/745 |
| 3,750,804 | 8/1973 | Lemelson | 414/280 X |
| 3,792,783 | 2/1974 | Brown | 414/22 |
| 3,844,420 | 10/1974 | Walling et al. | 414/745 |

FOREIGN PATENT DOCUMENTS 333810 12/1958 Switzerland ...................... 414/257

*Primary Examiner*—Frank E. Werner
*Attorney, Agent, or Firm*—Lalos, Leeds, Keegan, Lett & Marsh

[57] ABSTRACT

A pipe feeder for automatically moving pipe off of or onto the top row of a stack of pipe. A pair of stanchions are provided with a system for supporting a plurality of rows of pipe next to the stanchions such that the length of pipe is generally parallel to the plane of the stanchions. A pair of upright guides are coupled to the pair of stanchions respectively and a frame is coupled to the pair of guides for movement to different levels along the pair of guides. The frame comprises a pair of endless chains adapted to rest across the top row of pipe. Each chain has a plurality of feet attached thereto for engaging the pipe on which the pair of endless chains rest for moving pipe when the chains are driven. A driving system is provided for driving the pair of endless chains in unison in first or second directions for moving the pipe toward or away from the pair of stanchions.

13 Claims, 36 Drawing Figures

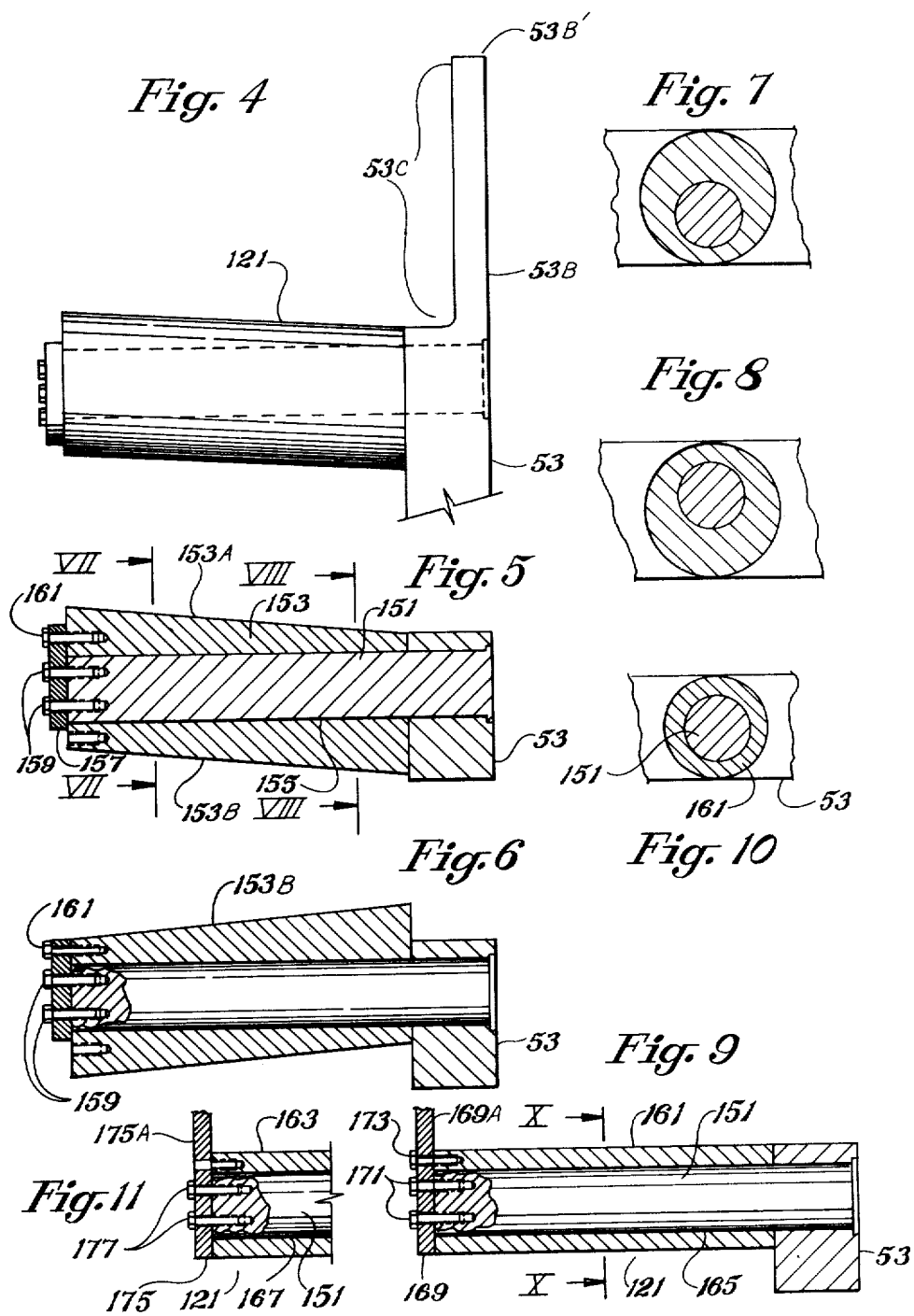

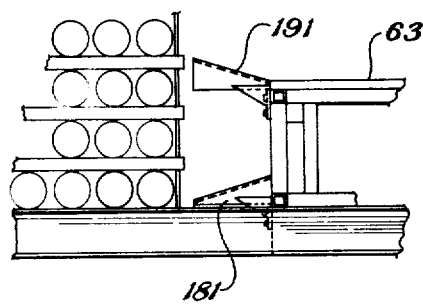
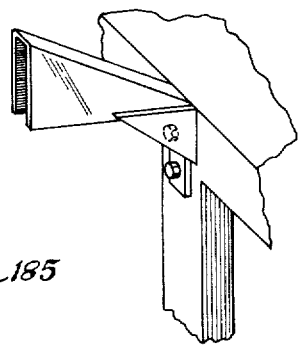
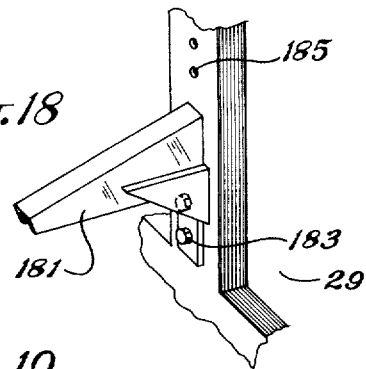
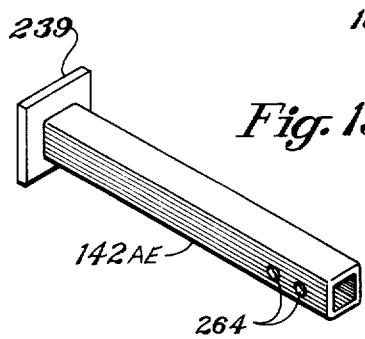
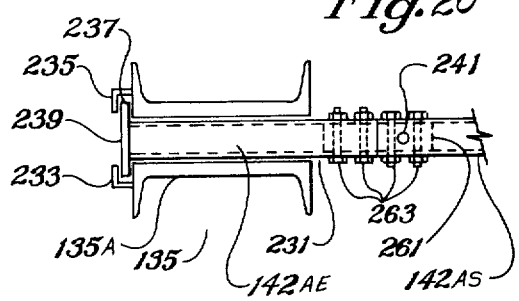
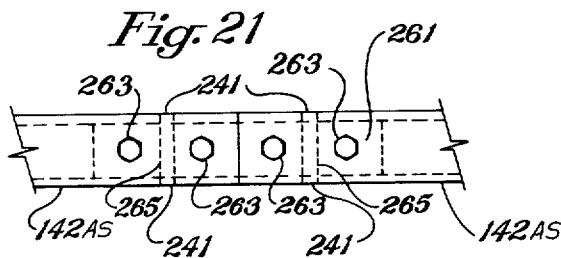
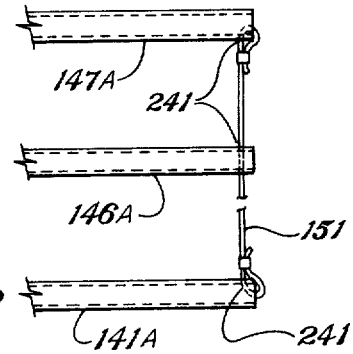

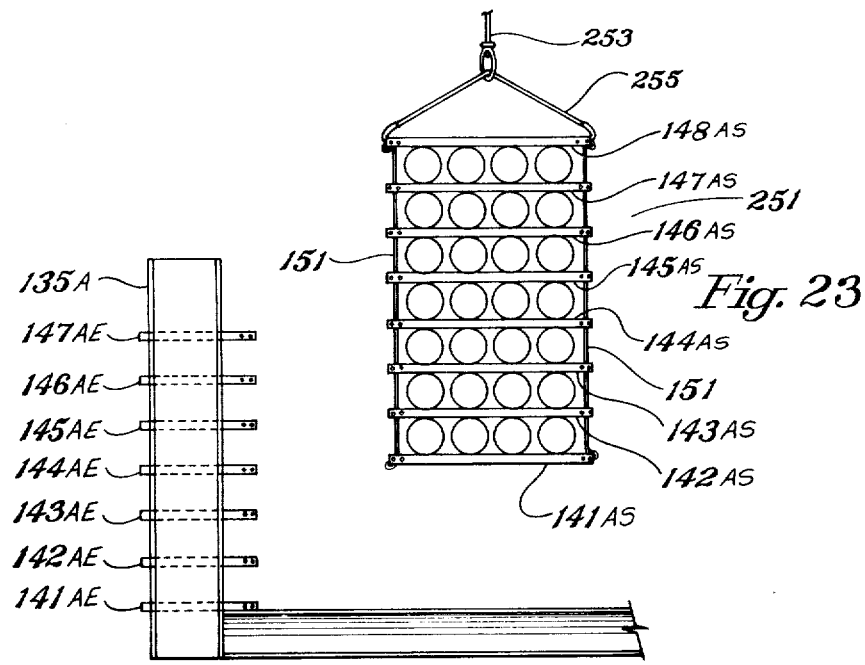
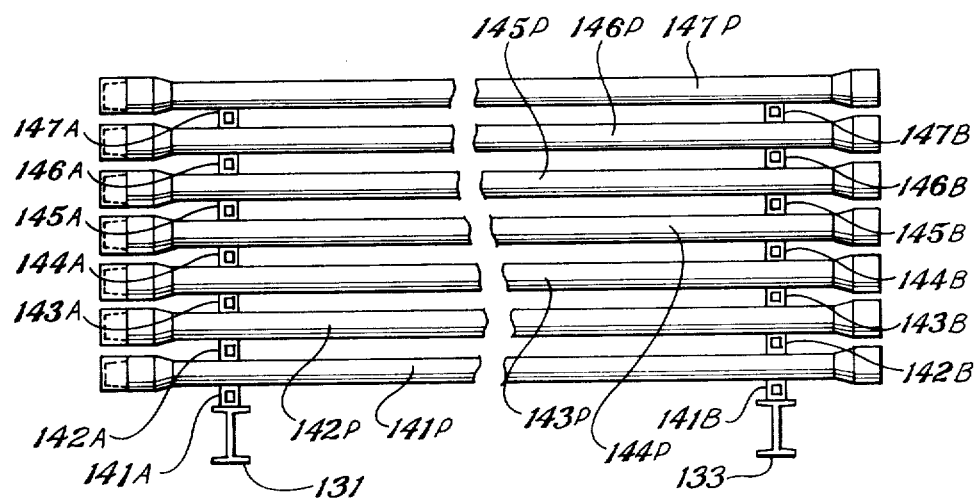

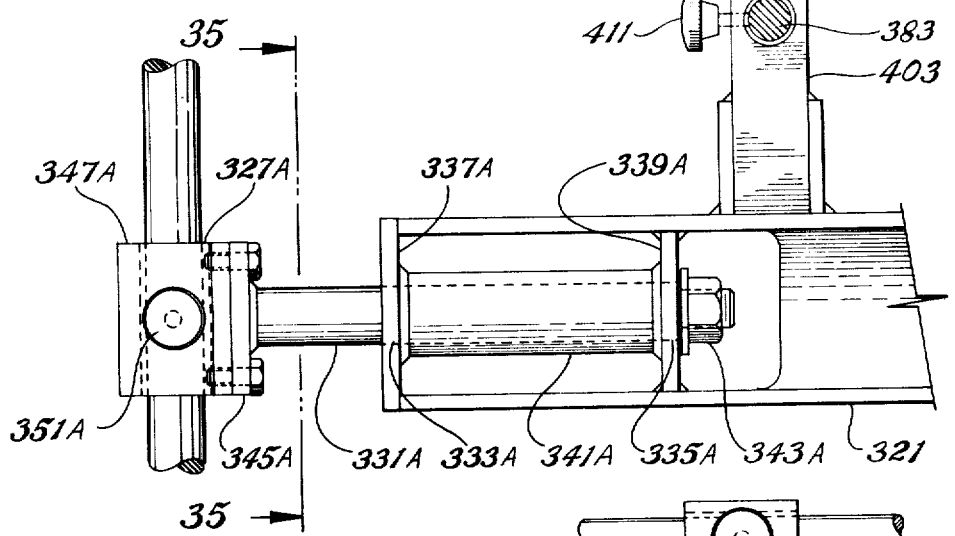
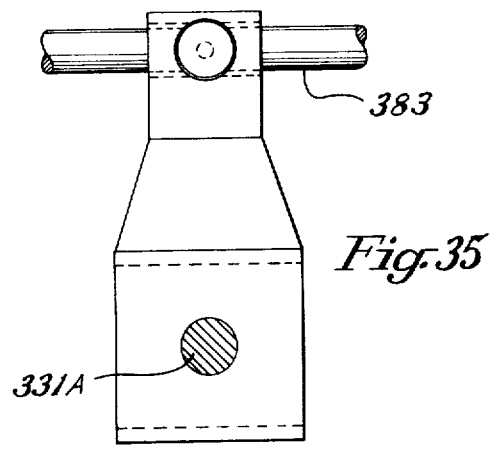
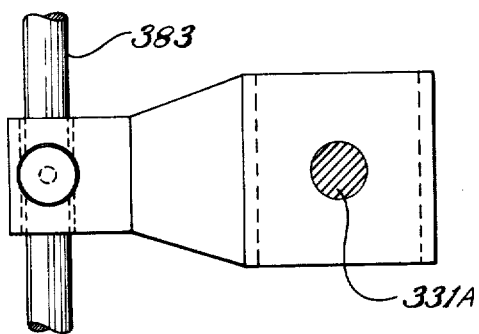
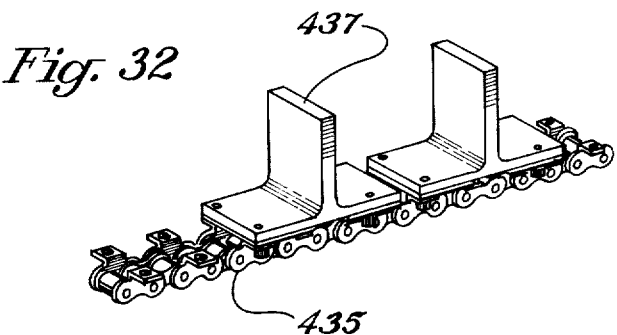
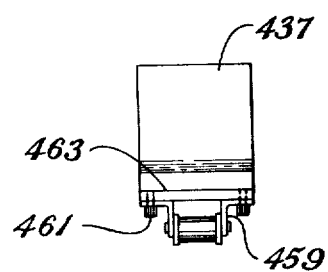

PIPE FEEDING SYSTEM

FIELD OF THE INVENTION

The present invention relates to an automatic pipe feeder for moving pipe off of or onto the top row of a stack of pipe.

DESCRIPTION OF THE PRIOR ART

In drilling operations, pipe is stacked near the drilling rig for use as needed. The known procedures of removing or restacking the pipe is by manual labor or by cranes. These procedures are time consuming and costly.

SUMMARY OF THE INVENTION

It is an object of the present invention to provide an automatic system for moving pipe off of the top row of a stack of pipe to a pipe transfer system or for moving the pipe onto the top row from the pipe transfer system.

The automatic system comprises a pair of stanchions secured in place at spaced apart positions, means for supporting a plurality of rows of pipe next to said stanchions such that the length of said pipe is generally parallel to the plane defined by said pair of stanchions, a pair of upright guide means coupled to said pair of stanchions respectively, and a frame coupled to said pair of upright guide means for movement to different levels along said pair of upright guide means. The frame comprises a pair of spaced apart endless drive means adapted to rest across the top row of pipe. Each endless drive means comprises a plurality of feet means adapted to engage the pipe on which said pair of endless drive means rests and move the pipe toward or away from said pair of stanchions depending upon which directions said pair of endless drive means are driven. Means is provided for driving said pair of endless drive means in unison in first or second directions for moving the pipe on which said pair of endless drive means rest, toward or away from said pair of stanchions.

In a further aspect the frame may be swiveled about an axis extending between the pair of stanchions or be moved linerally relative to the pair of stanchions in a direction generally perpendicular to the plane of said stanchions.

In another aspect, a second pair of endless drive means having feet attached thereto is coupled to the first pair of endless drive means. The second pair of endless drive means is driven by the first pair of endless drive means. The second pair of endless drive means may be moved upward at an angle relative to the first pair of endless drive means to temporarily move the second pair of endless drive means out of the way.

BRIEF DESCRIPTION OF THE DRAWINGS

FIG. 4 is a side view of a pipe supporting lug with an eccentric sleeve, connected to one of the arms of the pipe transfer system of FIGS. 1-3. The view of FIG. 4 is an end view of the arm with the arm at an angle as shown in FIG. 1.

FIG. 5 in a cross-sectional view of the lug and arm of FIG. 4 as seen when the arm is horizontal.

FIG. 6 is a cross-section of the lug of FIG. 4 with its eccentric sleeve indexed 180° from that shown in FIG. 5.

FIG. 7 is a cross-section of FIG. 5 taken along the lines of 7—7 thereof.

FIG. 8 is a cross-section of FIG. 5 taken along the lines of 8—8 thereof.

FIG. 9 is a cross-sectional view of a pipe supporting lug with a concentric sleeve connected to one of the arms of the pipe transfer system of FIG. 1-3.

FIG. 10 is a cross-section of FIG. 9 taken along the lines 10—10 thereof.

FIG. 11 is a partial cross-sectional view of a pipe supporting lug with a rotatable concentric sleeve.

FIG. 16 illustrates pipe ramps connected to the side of the pipe handling apparatus of FIG. 1.

FIG. 17 is a perspective view of the upper ramp of FIG. 16.

FIG. 18 is a perspective view of the lower ramp of FIG. 16.

FIG. 19 illustrates a short rail member which forms part of one of the pipe supporting rails of the racks of FIG. 1 and 3.

FIG. 20 is a top view of a stanchion guide for slidably holding the pipe surrounding rails of the racks of FIGS. 1 and 3.

FIG. 21 illustrates a coupling member for removably coupling together rail members for forming the pipe supporting rails or the rack of FIGS. 1 and 3.

FIG. 22 illustrates the free ends of a vertical row of the rails of the rack of FIG. 3 tied together.

FIG. 23 illustrates a module of pipe secured together with rails and straps and which is being lowered for placement on a rack.

FIG. 24 is a side view of the rack of FIG. 3 on the left.

FIG. 32 is a perspective view of a portion of the chain of one of the arms of the frame of FIG. 27 with feet attached thereto.

FIG. 33 is an end view of one of the feet of FIG. 32.

FIG. 34 is a partial cross-sectional view of the support structure of the frame of FIG. 27 illustrating its swivel arrangement;

FIG. 35 is a view of FIG. 34 taken along the lines 35—35 thereof.

FIG. 36 is a view similar to that of FIG. 35 with the support structure swiveled 90° counter clockwise from that shown in FIG. 35.

PIPE HANDLING AND PIPE STORAGE SYSTEMS

Figure 1:
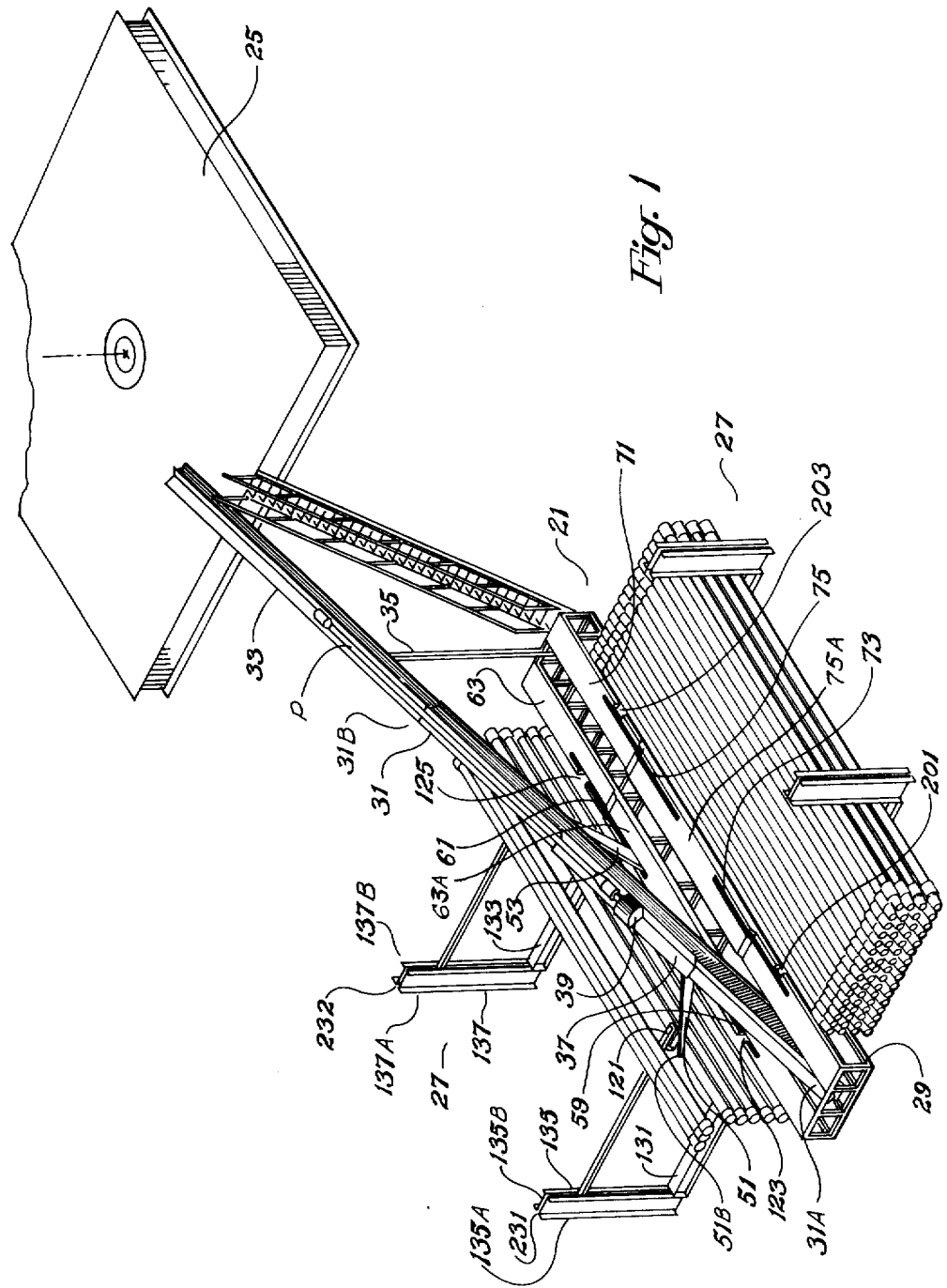
FIG. 1 is a perspective view of a pipe handling apparatus with a pipe transfer system located on one side of the apparatus next to a pipe rack.
Figure 2:
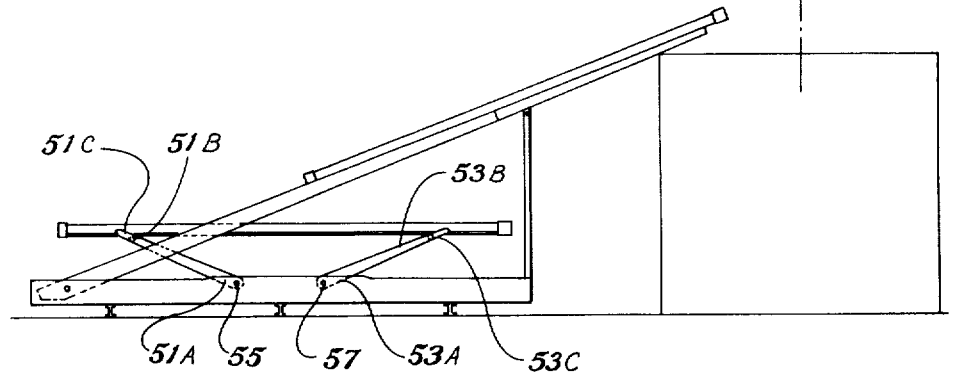
FIG. 2 is a partial side view of the pipe handling apparatus and pipe transfer system of FIG. 1.
Figure 3:
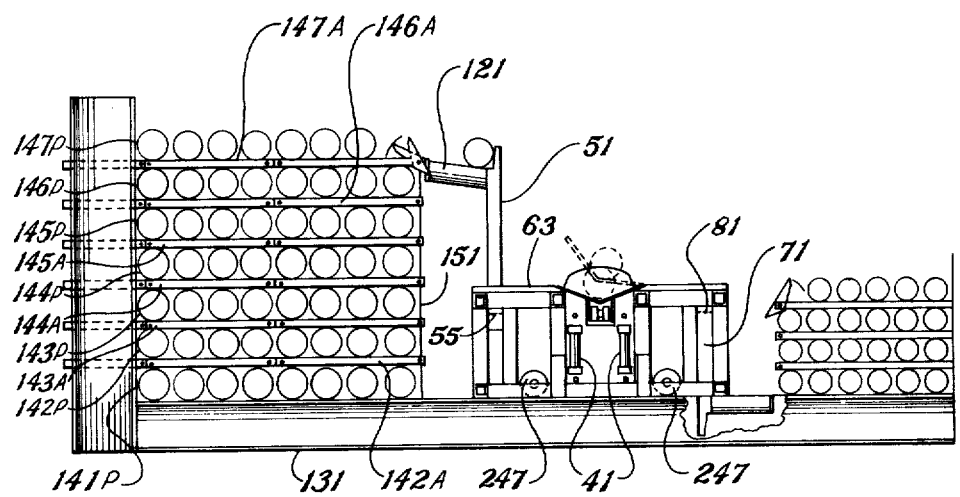
FIG. 3 is an end view of the pipe transfer system of FIG. 1, illustrating its position between a pipe rack and the pipe handling apparatus.

Referring now to FIGS. 1-3 there will be described first the pipe handling apparatus 21 for raising pipe P such as casing, drill pipe, collars, or tubing up to a derrick floor 25 of a drilling rig (not shown) or for removing the pipe 23 from the derrick floor 25. The pipe P is stored in racks 27 on both sides of the apparatus 21. The apparatus 21 comprises an elongated frame 29 which supports a trough 31 which may be moved upward to an inclined position in alignment with a fixed trough 33 as shown in FIGS. 1 and 2 or downward to a horizontal position as shown in FIG. 3. The fixed trough 33 is supported in an inclined position by the derrick floor 25 and support structure 35. The trough 31 comprises a tiltable portion 37 which may be tilted about its axis in either direction when the trough 31 is horizontal, to dump pipe on either side of the apparatus for storage in the racks 27. Also provided is a carriage 39 driven by an endless chain (not shown) for movement along trough 31 in either direction between its ends 31A and 31B.

When it is desired to move pipe from either of the racks 27 upward to the derrick floor 25, the following operations take place. The trough 31 is located in its horizontal position and the carriage 39 is located at the rear end 31A of the trough 31. A length of pipe is transferred from one of the racks 27 into the trough 31. Trough 31 next is raised to be in alignment with fixed trough 33. The endless chain drive for carriage 39 is actuated to move carriage 39 up the trough 31 to its end 31B carrying the pipe with it. The carriage pushes the pipe 23 to an upward position until its end overlies the derrick floor. The pipe then is lifted into the derrick by cable hoists and/or elevators in the derrick. The carriage 39 is retracted to the rear end 31A of the trough 31; the trough 31 lowered to a horizontal position; and the process is repeated.

In removing pipe from the derrick floor 25, the trough 31 is raised to be in alignment with fixed trough 33 and the carriage moved to an upward position along trough 31. The cable hoist locates a length of pipe in trough 31 and the carriage 39 is actuated to move the pipe downward to the lower end of trough 31. Trough 31 is lowered to a horizontal position and tiltable trough portion 37 is tilted to dump the pipe on either side of the apparatus 21 for storage in racks 27. In FIG. 3, the trough portion 37 is shown dumping the pipe 23 on the right side of the apparatus 21. Hydraulic cylinders 41 are provided for tilting the trough portion 37 in either direction along its axis.

The pipe transfer system for transferring pipe between the racks 27 and the pipe handling apparatus comprises a pair of aligned arms located on the side of the pipe handling apparatus and next to a pipe rack. In FIG. 1, one pair of arms 51 and 53 are shown on the left of the apparatus 21 next to the left rack 27. As shown in FIG. 2, the ends 51A and 51B of arms 51 and 53 are pivotally coupled to the frame 29 at 55 and 57. The arms extend through slots 59 and 61 formed through the left catwalk 63 of the apparatus 21 next to its left edge whereby the free ends 51B and 53B of the arms 51 and 53 may move to an upper position above the catwalk 63 and to a lower position below the catwalk 63. In FIG. 3, the free end of arm 51 is shown in an upper position. Although not shown in FIG. 1, a pair of arms similar to arms 51 and 53 will be located on the right side of the apparatus 21 next to the right rack. The right pair of arms have their ends pivotally coupled to the frame at the level of pivot points 55 and 57 whereby their free ends may move to an upper position above the catwalk 71 and a lower position below the catwalk. The arms of the right pair of arms extend through slots 73 and 75 formed through catwalk 71 next to its right edge. In FIG. 3, the free end of arm 77 of the right pair of arms is shown in a lower position. The free ends of arms 51 and 53 can be moved to the same lower level.

In FIG. 3, the level of the pivot point 55 of arm 51 is more accurately shown. The pivot point 57 of arm 53 is at the same level. The pivot point of the arm 77 is shown in FIG. 3 at 81.

A hydraulic system is employed for moving the free ends 51B and 53B of arms 51 and 53 together to upward or downward positions or to any level inbetween. A similar hydraulic system is employed for moving together the pair of arms on the right.

Figure 12:
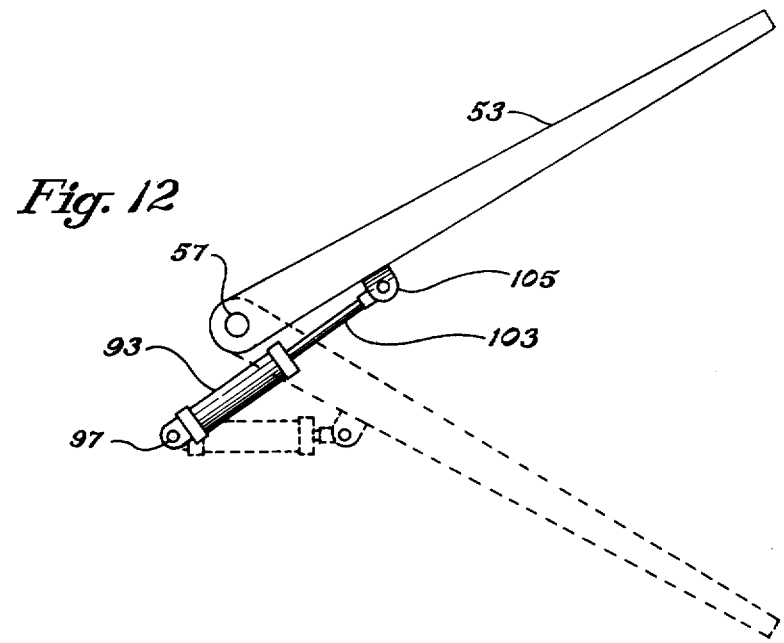
FIG. 12 illustrates a hydraulic cylinder for operating one of the arms of the pipe transfer system of FIGS. 1-3.
Figure 13:
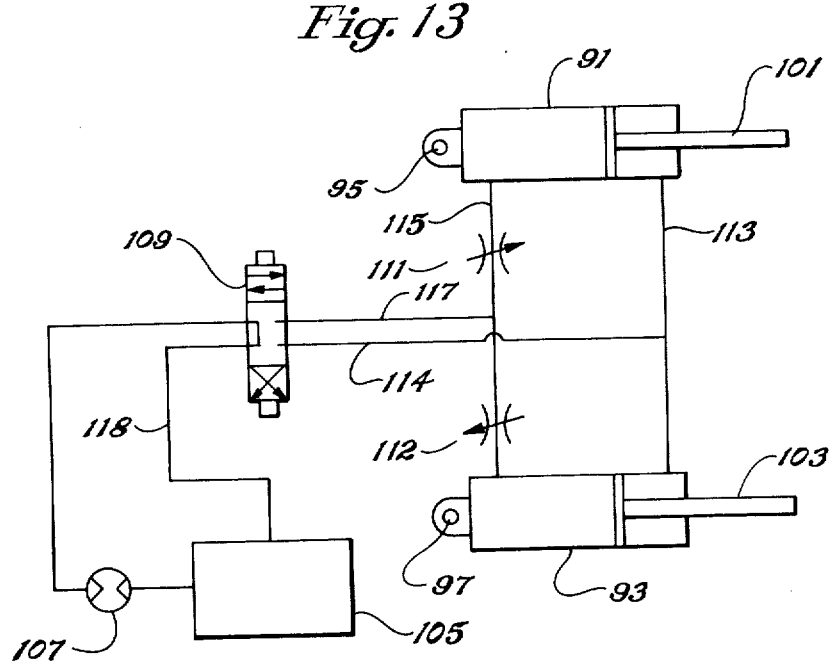
FIG. 13 schematically illustrates a dual hydraulic system for operating a pair of the arms of the pipe transfer system of FIGS. 1-3.

Referring to FIGS. 12 and 13, the hydraulic system for arms 51 and 53 will be described. It is to be understood that a similar hydraulic system will be employed for the right pair of arms. The hydraulic system for arms 51 and 53 comprise a pair of cylinders 91 and 93 having their ends pivotally coupled to the frame 29 at 95 and 97. The pistons 101 and 103 of the cylinders 91 and 93 are pivotally coupled to arms 51 and 53 respectively. In FIG. 12, the piston 103 of cylinder 93 is shown pivotally coupled to an ear 105 which is fixedly connected to arm 53. The piston 101 of cylinder 91 is pivotally coupled to its arm 51 in a similar manner. When the pistons 101 and 103 are forced outward, the free ends of arms 51 and 53 are moved upward and when the pistons 101 and 103 are moved inward, the free ends of the arms 51 and 53 are moved downward. The hydraulic system for operating the cylinders 91 and 93 comprise a hydraulic oil tank 105, a pump 107, a 4-way directional control valve 109, adjustable flow control valves 111 and 113 and flow lines 113-118. The hydraulic fluid is metered so that the pistons 101 and 103 move out together or in together.

Connected to the outer sides of each of arms 51 and 53 is a pipe supporting lug 121. Each lug is connected near but spaced inward from the very tip of the free end of its arm. For example, lug 121 of arm 53 is spaced from the very tip 53B' of the free end 53B of arm 53 about 10 or 12 inches. The portion of arms 51 and 53 from their lugs 121 to the very tip of their free ends will hereinafter be referred to as the free end extensions 51C and 53C of the arms. The lugs 121 extend outward from their arms toward the rack 27 next to the apparatus 21 on the side on which the arms are located. For example, lugs 121 of arms 51 and 53 extend toward the left rack. Vertical slots 123 and 125 are formed in the side of the frame 29 for receiving lugs 121 of arms 51 and 53 when the arms are moved to their lower positions.

The purpose of the lugs 121 is to support a length of pipe when it is being transferred between the rack 27 and the pipe handling apparatus 21. Each rack 27 comprises two parallel I-beams 131 and 133 having a pair of upright stanchions 135 and 135 fixedly connected to their ends respectively. A plurality of pairs of rails 141A-141B, 142A-142B, 143A-143B, 144A-144B, etc. are provided for supporting a plurality of rows of pipe 141P, 142P, 143P, 144P, etc. (see FIG. 24). In FIG. 3, the lower pair of rails 141A, 141B is not shown and the lower row of pipe 141P is shown supported directly on the I-beams 131 and 133. Preferably the lower pair of rails 141A and 141B will be employed and supported on I-beams 131 and 133. The rails of each pair have one end removably coupled to the pair of stanchions 135 and 137 respectively. The other ends of each vertical row of rails 141A, 142A, 143A, 144A, etc. and 141B, 142B, 143B, 144B, etc. are connected together with straps or rods to prevent the pipe from rolling off of the rails. For example, in FIG. 22 the ends of the vertical row of rails 141A-147A opposite the stanchion 135 are shown tied together with a strap 151. Similarly, the ends of the vertical row of rails 141B-147B opposite the stanchion 137 also will be tied together with a strap. In FIG. 3, the lower end of the strap 151 is tied to the I-beam 131.

In FIG. 3, the pipe of the upper row of pipe 147P is shown in a position to be removed with the pipe transfer system and loaded in the trough 31 for transfer to the derrick floor. In the transfer process, the arms 51 and 53 are moved upward to position the lugs 121 at the level of the upper rails 145A and 147B shown in FIG. 3 and a length of pipe is rolled laterally from the top row onto the lugs 121. The arms 51 and 53 then are lowered to a horizontal level where their top surfaces are level with the catwalk 63. The free end extensions 51C and 53C of the arms prevent the pipe from rolling off of the lugs until the arms are level with the catwalk 63. The pipe then is rolled across the catwalk 63 onto the trough 31. The arms then are raised again and the next pipe transferred to the trough. The process is repeated until the top row of pipe is removed at which time the pair of rails 147A, 147B is removed and the pipe of the next row of pipe sequentially transferred to the trough. When the row of pipe 143P is reached, the arms 51 and 53 move down and then up to sequentially transfer its pipe to the trough 31. Similarly when transferring pipe from the rows of pipe below row 143P, the arms 51 and 53 move down and then up to sequentially transfer pipe to the trough 31.

Referring to FIGS. 4-8, each of the lugs 121 for the arms 51 and 53 in one embodiment comprises a shaft 151 fixedly secured to the arm with a sleeve 153 eccentrically located around the shaft. As seen the sleeve has a central aperture 155 eccentrically formed therethrough relative to its edges 153A and 153B for receiving the shaft. The sleeve may be located in the position shown in FIG. 5 relative to the shaft and arm or indexed 180° and located in the position shown in FIG. 6 relative to the shaft and arm. The sleeve is securely held in either position by end plate 157 and bolts 159 and 161. The bolt 161 is removable to allow indexing to take place. When the sleeve is located in the position shown in FIG. 5, its top edge or surface 153A slants from its outer edge downward toward the arm. When the sleeve is located in the position shown in FIG. 6, its top edge or surface 153B slants from its arm downward toward its outer edge.

When the arms 51 and 53 are employed for transferring pipe from the rack to the trough 31, the sleeves 153 of their lugs are located in the position shown in FIG. 5. When a length of pipe is rolled from a row of pipe (above the catwalk 63) onto the lugs when the arms are in the upper positions the pipe will roll down the inclined upper surfaces of the sleeves and be stopped by the free end extensions 51B and 53B of the arms 51 and 53. As the arms are lowered to horizontal positions with their top edges level with the catwalk 63, the free end extensions will become horizontal and the upper inclined surfaces of the sleeve 153 will cause the pipe to roll across the catwalk 63 into the trough 31. When a length of pipe is rolled from a row of pipe (below the catwalk 63) onto the lugs when the arms are in the lower positions the pipe will roll down the inclined upper surfaces of the sleeves and butt up against the side of the frame 29 of the apparatus 21. The arms 51 and 53 are raised until they reach their horizontal position level with the catwalk 63. The upper inclined surfaces of the sleeves 153 will cause the pipe to roll across the catwalk 63 into the trough 31.

The lugs 121 also are employed for transferring pipe from the trough 31 to the rack 27 when stacking to an upper level above the catwalk 63. In this instance, the sleeves 153 of the lugs 121 of arms 51 and 53 will be located in the position shown in FIG. 6. In unloading pipe from the trough 31, the top edges of the arms 51 and 53 will be horizontal and about level with the catwalk 63. The trough portion 37 will be tilted to dump the pipe onto the lugs 121 of the arms. The inclined upper surfaces 153B of the sleeves 153 will cause the pipe to butt up against the stack of pipe on the rack until the upper row or level of the rack is reached at which time the pipe will roll from the lugs onto the upper row of the rack.

When the pipe is being unloaded from the trough 31 to the rack and when stacking to a lower level below the catwalk 63, the embodiment of FIGS. 9-11 and 18 preferably will be used. In this embodiment, each lug 121 of the arms 51 and 53 will comprise a shaft 151 fixedly secured thereto with a concentric sleeve located around the shaft. In FIGS. 9 and 10, the concentric sleeve of arm 53 is shown at 161 and in FIG. 11 a portion of the concentric sleeve of arm 51 is shown at 163. The sleeves 161 and 163 are cylindrical having cylindrical apertures 165 and 167 formed along their axes respectively. Sleeve 161 is fixedly held in place to the shaft 151 of arm 53 by an end plate 169 and bolts 171 and 173. The end plate 169 has an upward extension 169A which extends above the upper surface of sleeve 161. Sleeve 163 of arm 51 is held in place by end plate 175 and bolts 177. The sleeve 163, however, is not bolted to the end plate 175 and is allowed to rotate about its shaft 151. The end plate 175 has an upward extension 175A which extends above the upper surface of sleeve 163.

Also provided are two ramps 181 which are adapted to be attached to the side of the frame 29 of the apparatus at spaced apart positions. The ramps 181 slant downward toward the rack. One of the ramps is shown at 181 in FIGS. 16 and 18. The two ramps 181 will be attached to the side of the frame 29 at the same level below the catwalk 63. Bolts or pegs 183 are employed for attaching the ramps to the side of the frame 29. A plurality of vertical apertures 185 are provided in the frame 29 for allowing the pair of ramps 181 to be attached to the frame at different levels depending upon the level of the stack of pipe to which pipe is being transferred.

Assume that pipe is to be transferred from the trough 31 and stacked on the lowest level of the rack. The arms 51 and 53 are located between the I-beams 131 and 133 such that when they are in their lowest positions, their lugs 121 including the end plate extensions 169A and 175A will be below the level of the I-beams 131 and 133 as shown with respect to the right pair of arms in FIG. 3. The ramps 181 will be located in the position shown in FIG. 16. The arms 51 and 53 will be located in horizontal positions level with the catwalk 63. The pipe in the trough will be dumped onto the lugs by tilting the tilting portion 37 will prevent trough. Extensions 169A and 175A of the lugs will prevent the pipe from rolling off of the lugs until the lugs reach the ramps 181 and are moved below the ramps. The ramps 181 then will cause the pipe to roll onto the lowest level of the rack. When stacking onto the next level of the rack, the ramps 181 are merely moved up a suitable distance.

The purpose of having one sleeve 161 fixed and the other sleeve 163 rotatable is to prevent the pipe from moving longitudinally on the lugs as the arms are pivoted thereby preventing the pipe from falling off of the lugs as the arms 51 and 53 are pivoted and the lugs 121 are moved apart from each other. The position of the pipe on the lug with the sleeve 161 will remain fixed with respect to the sleeve while the sleeve 163 will rotate as the lugs move apart or together so that longitudinal movement of the pipe on the lugs will not occur.

It is to be understood that the lugs with the concentric sleeves of FIGS. 9-11 also may be employed for transferring pipe from the trough 31 to the rack at an upper level above the catwalk 63 although they will not have the advantages of the eccentric sleeves when indexed to the position shown in FIG. 6. In this usage, end plates 169 and 175 will not have their upward extensions 169A and 175A. The lugs with the concentric sleeves of FIGS. 9-11 also may be used for transferring pipe from an upper level of the rack (above catwalk 63) to the trough 31. In this instance a pair of ramps 191 will be attached to the side of the frame 29 of the apparatus 21 at the level of the catwalk 63 to facilitate removal of the pipe from the concentric sleeves onto the catwalk 63 and into the trough 31. In addition, the lugs with the concentric sleeves of FIGS. 9-11 may be employed for transferring pipe from a lower level of the rack (below catwalk 63) to the trough 31 although they will not have the advantages of the eccentric sleeves when indexed to the positions shown in FIG. 5.

The use of the lugs with the eccentric sleeves or with the concentric sleeves in combination with ramps 181 or 191 as described above have advantages in that transferring pipe from the rack to the trough or from the trough to the rack is made automatic resulting in less manpower needed and a safer transfer system.

Although the free ends 51C and 53C of the arms 51 and 53 are shown facing outward in opposite directions, it is to be understood that their pivot axes 55 and 57 could be moved further apart and the arms 51 and 53 located such that their free ends 51C and 53C face each other. The pair of arms on the right of the apparatus could be modified in the same manner.

It is to be understood that the pair of arms on the right of the apparatus also will employ lugs similar to that shown in FIGS. 4-8 or FIGS. 9-11. The right side of the frame 29 has vertical slots 201 and 203 for receiving the lugs on the right pair of arms to allow the arms to be moved to their lower most positions.

The catwalks 63 and 75 have raised central portions 63A and 75A whereby the collars or thread protectors at the ends of the pipe do not engage the catwalks when the pipe is rolled across the catwalks. This insures that the pipe will roll straight across the catwalks if the diameter of the thread protector or collar at one end of the pipe is larger than that at the other end.

It is to be understood that the pipe transfer system comprising the arms 51 and 53 could be used with other types of pipe handling machines other than the one described in connection with FIGS. 1-3. Although the pipe transfer system comprising the arms 51 and 53 preferably is intended for use on an offshore or ocean platforms it is to be understood that it could be used in other facilities, for example, in a pipe storage yard. In this situation, it would be used in connection with simply pipe storage rather than in connection with well drilling.

Figure 14:
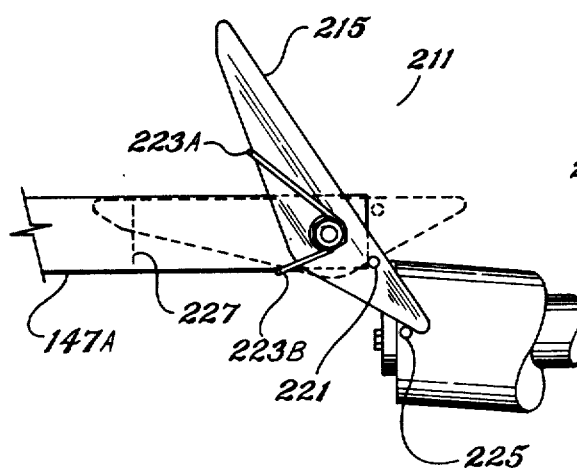
FIG. 14 illustrates a gate coupled to the end of the upper pipe supporting rail of the rack of FIG. 3 on the left.
Figure 15:
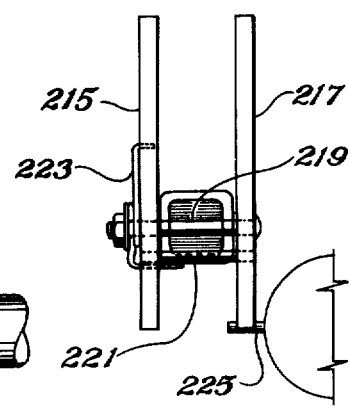
FIG. 15 is an end view of the gate of FIG. 14.

Preferably a pair of gates will be provided which will be removably connectable to the pair of rails supporting the uppermost row of pipe (as shown in FIG. 3) of the rack to prevent the upper row of pipe from rolling off of the rack except when pipe is being unloaded from the upper row or loaded thereon. Referring to FIGS. 14 and 15, one of the gates 211 will be described. It comprises a pair of arms 215 and 217 which are pivotally coupled to the rail shown (147A) on each side thereof by a removable bolt 219. The rails preferably are hollow tubes square in cross-section. The arms 215 and 217 are fixedly connected together by a pin 221. The arms of the gate can be moved to a nearly upright position as shown in solid line in FIG. 14 to a horizontal position as shown in dotted line in FIG. 14. In the upright position, the pin 221 engages the end of the rail and prevents the arm from moving further clockwise thereby preventing the pipe from rolling off of the top pair of rails. In the horizontal position, the upper edge of the arms are level with the top surface of the rails thereby allowing pipe to roll off of or onto the rails. A coil spring 223 is wound around the end of the bolt 219 and has one end 223A which engages the under edge of arm 215 and one end 223B which engages the underside of the rail. The spring 223 normally urges the arms of the gate in the upright position thereby preventing the pipe from rolling off of the top pair of rails. When moving the arms 51 and 53 upward to the upper pair of rails, a pin 225 extending from the lug 121 will engage the lower edge of arm 217 and move the arms of the gate to a horizontal position as shown in FIG. 14. The upward travel of the arms 51 and 53 will terminate at that point and pipe can be rolled from the top rail onto the lugs 121 or vice versa.

Preferably a solid insert is inserted in the end of each of the rails to provide increased strength at the end of the rails to prevent the ends from bending as the pipe is rolled onto or from the rails. a solid insert is identified in dotted form at 227 in FIG. 14. The insert may be removable and when inserted in place the bolt 219 will extend through an aperture formed through the insert.

The gate 211 may be removed from the end of the rail by removing bolt 219. As the stack of pipe in the rack is built up or reduced, the gates will be repositioned so that they are attached only to the ends of the rails upper pair of rails. For example, in FIG. 3, a gate 211 is shown attached to the end of the rail 147A of the upper pair of rails. A similar gate 211 will be attached to rail 147B and a pin similar to pin 225 will be attached to the other lug 121. In transferring pipe from the rack to the trough, when all of the pipe is unloaded from the rails 147A and 147B and these rails removed, the gates 211 will be removed from their rails and attached to the ends of the rails 146A and 146B.

When loading pipe onto or removing pipe from a row of pipe below catwalk 63 whereby the arms 51 and 53 have to move down, the embodiment of the gate of FIGS. 26 and 25 will be employed. The gate 211 is the same as shown in FIG. 14 and 15 except that a tab 228 will be connected to arm 215. In this usage, tab 230 will not be employed. The lugs 121 is shown located on the side of the gate next to arm 215. A rod 229 is attached to the lug 121 such that as the lug 121 goes down past the gate 211, the end 229A of rod 229 will engage tab 228 and move the arms level with the top of the rail 147A at which point the lug 121 will stop. A similar gate will be attached to the other rail 147B and a rod similar to rod 229 will be attached to the other lug.

Figure 25:
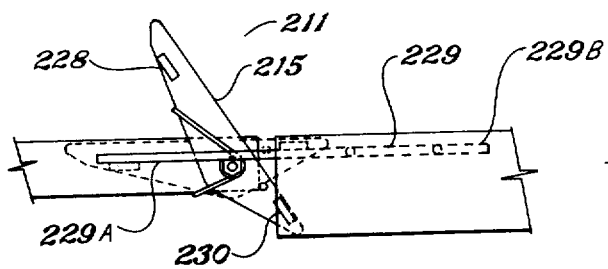
FIGS. 25 and 26 illustrate another embodiment of the gate of FIGS. 14 and 15.
Figure 26:
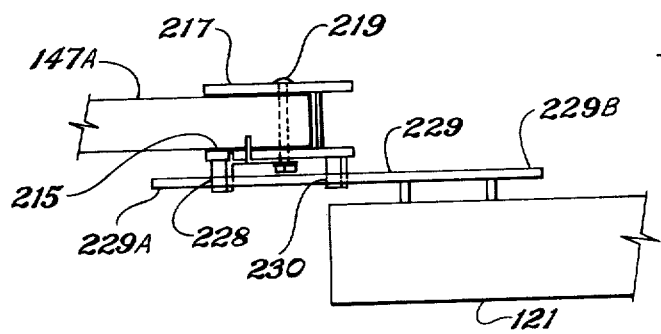

The embodiment of FIGS. 25 and 26 also may be used to load pipe onto or remove pipe from a row of pipe above the catwalk 63 by attaching tab 230 to the arm 215 and reversing the position of rod 229 on lug 121 whereby end 229B can engage tab 230. As the lug moves upward, end 229B will engage tab 230 and move the arms level with the rail 147A at which point the lug 121 will stop. A tab similar to tab 230 will be attached to the other gate of rail 147B and the rod 229 of the other lug reversed in position on the lug. Tabs 230 will be employed only in this usage.

The racks 27 now will be described in detail. The description will be made with respect to the rack 27 on the left in FIGS. 1 and 3 although it is to be understood that the rack 27 on the right will be the same. Each stanchion 135 and 137 comprises two parallel upright members providing a vertical slot or space for slidingly receiving the rails. In FIG. 1, the two parallel upright members of stanchion 135 are identified at 135A and 135B and the two parallel upright members of stanchion 137 are identified at 137A and 137B. Referring to FIG. 20, stanchion 135 is shown in more detail. The vertical slot or space between members 135A and 135B is identified at 231. In FIG. 1, the vertical slot or space between stanchion members 137A and 137B is identified at 232. The rear ends of members 135A and 135B have L-shaped strips 233 and 235 secured along their lengths providing a cross-slot 237. Each rail has a cross member 239 secured to its rear end adapted to slidingly fit in the cross-slot 237. The rear ends of stanchion members 137A and 137B have similar L-shaped strips secured thereto forming a cross-slot for receiving the rear cross member of its rails. The rails can be inserted into the vertical slots of the stanchion members and removed therefrom through the open tops. The purpose of the L-shaped strips 233 and 235 and the cross members 239 of the rails is to prevent longitudinal movement of the rails once they are in the stanchion slots. In stacking pipe on the rack 27, the rails may be inserted into the stanchion slots as each row or tier of pipe is completed. In removing pipe from the rack, the rails are removed from the stanchion slots as each row of tier of pipe is removed from the rack.

Preferably the rails are square tubing which will not rotate and which will separate the rows of pipe sufficient such that upset pins, collars, and thread protectors of each row of pipe can be separated sufficiently such that they will not interfere with the lower row of pipe as pipe is rolled along the rails. Since the rails are vertically movable, different diameter pipe can be stored in different rows as needed. The ends of the rails have vertical apertures 241 formed therethrough whereby straps 151 may be inserted and tied to the upper and lower rails as shown in FIG. 22 or to the upper rail and to the lower I-Beams as shown in FIG. 3 to prevent the pipe from rolling off. Instead of straps, rods may be inserted through the apertures. The rack has particular usefulness on drilling ships and on jack-up rigs where the drilling platform is in motion and the pipe must be secured at all times to prevent it from shifting and causing danger.

On many offshore platforms, two drilling rigs are employed each capable of drilling twenty-one wells in a grid pattern, seven in one direction and three in the other direction. Usually the wells are drilled about 7½ feet apart. When one well is drilled, the rig is moved over 7½ feet to drill another well. As shown in FIG. 3, the apparatus 21 is mounted on wheels 247 which are adapted to roll along I-Beams 131 and 133. This allows the center line of the apparatus 21 (along the trough 31) to be positioned along the center line of the rig or well as the rig is moved 7½ feet to the side to a new well site. In order to allow the apparatus 21 to be moved sideways along I-Beams 131 and 133, provision must be made to allow the stack of pipe in racks 27 to be readily moved to provide room for the apparatus. This is accomplished by allowing the stack of pipe in the racks to be located, stored, and removed in modules. One such module is shown at 251 in FIG. 23. It comprises a plurality of rows of pipe supported by a plurality of rows of pairs of rail sections having their ends tied together by straps or rods 151. In FIG. 23, one half of each pair of rail sections are identified by reference numerals 141AS, 142AS, 143AS, 144AS, 145AS, 146AS, 147AS and 148AS. The other half of each pair of rail sections (141BS, 142BS, 143BS, 144BS, 145BS, 146BS, 147BS and 148BS) are not shown. Rail sections 141AS and 148AS will be strong enough to carry the weight of the module 251. The length of each rail section is 7½ feet to match the distance between well sites. The module of pipe may be located on or removed from the I-Beams 131 and 133 by a crane or hoist having its lift line 253 coupled to lines 255 (only one shown) which are attached to the module 251. In FIG. 3, two such modules are shown making up the stack of pipe on the rack 27 on the left. The bottom rail 141A is not shown although it and rail 141B will be present if the stack is formed by locating modules of pipe on the I-Beams 131 and 133. In FIG. 3, the top rail 148A and 148B have been removed to allow removal of the top row of pipe. In FIG. 3, each rail is formed by two 7½ feet rail sections removably connected together and by an end section removably connected to one of the 7½ feet rail sections. The end sections are adapted to slidingly fit in a vertical stanchion slot. In FIG. 23, the end sections adapted to fit in the slot 231 of stanchion 135 are identified at 141AE, 142AE, 143AE, 144AE, 145AE, 146AE, and 147AE. They are shown spaced apart in FIG. 23 to illustrate the positions they will have when connected to the 7½ feet rail sections. The end sections (141BE, 142BE, 143BE, 144BE, 145BE, 146BE and 147BE) adapted to fit in the slot 232 of stanchion 137 are not shown. End section 142AE is shown in FIGS. 19 and 20. All of the end sections are the same as end section 142AE. FIG. 21 illustrates the manner in which two 7½ feet rail sections are removably connected together. Rail sections 142AS are illustrated. A solid insert 261 is removably located in both rail sections 142AS which in turn are connected to the insert by bolts 263. Although not shown, each rail section has two horizontal apertures formed through each end for receiving the bolts 263. In addition, each insert 261 has four horizontal apertures formed therethrough for receiving the bolts 263. FIG. 20 illustrates the manner in which a rail end section and a 7½ feet rail section are connected together. A solid insert 261 is removably located in the ends of rail end section 142AE and 7½ feet rail section 142AS which in turn are connected to the insert by bolts 263. The horizontal apertures formed through rail end section 142AE for receiving the bolts 263 are illustrated in FIG. 19 at 264. Thus in FIG. 3, each rail is made up of two 7½ feet rail sections and a rail end section.

In forming the stack on the left of FIG. 3, a module of pipe 251 is located by crane on the rails 131 and 133 near the stanchions 135 and 137 with the 7½ feet rail sections in alignment with the stanchion slots 231 and 232. The straps 151 on the left of the module 251 are removed. The rail end sections are inserted in the stanchion slots 231 and 232 with the inserts 261 located in the ends of the rail end sections. The inserts may then be pulled outward a short distance to the right and partially located in the ends of the 7½ feet rail sections. The module may then be moved to the left by the crane to abutt the left ends of the 7½ feet rail sections against the ends of the rail end sections and the bolts 263 employed to connect the 7½ feet rail sections and the rail end sections with the inserts. Instead of having single holes formed through the 7½ feet rail section and through the rail end sections for each bolt 263, elongated slots may be formed therethrough to facilitate location of the bolts through the holes formed through the inserts.

The straps 151 on the right of the first module 251 next are removed and inserts 261 are located in the right ends of its rail sections. The second module of pipe 251 then is located by a crane on the rails 131 and 133 to the right and near the first module with the respective rail sections of the two modules in alignment. The straps 151 on the left of the second module 251 are removed. The inserts located in the right ends of the rail sections of the first module may then be pulled outward a short distance to the right and partially located in the left ends of the rail sections of the second module. The second module may then be moved to the left by the crane to abutt the left ends of its rail sections against the right ends of the rail sections of the first module and the bolts 263 employed to connect together the abutting rail sections of the two modules.

As shown in FIG. 21, each insert 261 has two vertical apertures 265 in alignment with the vertical apertures 241 of the rail sections. If it is desired to remove pipe only from the right module of the left rack 27 in FIG. 3, a rod may be inserted through the apertures 241 of the right end rail sections of the first module and through the apertures 265 of the inserts. As pipe is removed from the rows of the right module, its rail sections will be disconnected from the rail sections of the left module and removed.

If it is desired to remove the right module of the left rack of FIG. 3 to provide room to move the apparatus 21 to the left in line with the center line of a new well, the following procedure is followed. The bolts 263 connecting the left and right modules together are removed and the crane is employed to move the right module to the right a distance sufficient to allow the inserts to be removed. Straps 151 then are inserted through the apertures 241 at the left ends of the rail sections of the right module and the module moved to a new position. Straps 151 also will be inserted through the apertures 241 at the right ends of the rail section of the left module.

The use of the modules 251 also has advantages since they can be prepackaged, loaded on trains or boats with cranes and transported wherever needed. On offshore drilling platforms, cranes on the platforms can unload them from the boats onto the platforms or racks where needed.

Thus the use of the modules 251 has advantages in that it results in a reduction of manual labor, the saving of a great deal of time, and increased efficiency of operation.

Although the rail sections forming each module were described as having a length of 7½ feet, it is to be understood that they could have other lengths depending upon the distance between adjacent wells.

DESCRIPTION OF THE PREFERRED EMBODIMENTS

In the rack as shown in FIGS. 1 and 3, the pipe on the top row of the stack is manually rolled onto the lugs 121 for transfer to the trough 31. In addition, when transferring the pipe to the rack, the pipe is manually moved on the top row once it has been placed there by the lugs 121.

Referring now to FIGS. 27–36 there will be described an automatic feeder 301 for automatically moving the pipe from the top row of the stack onto the lugs and for automatically moving the pipe on the top row once it has been placed there by the lugs.

Figure 27:
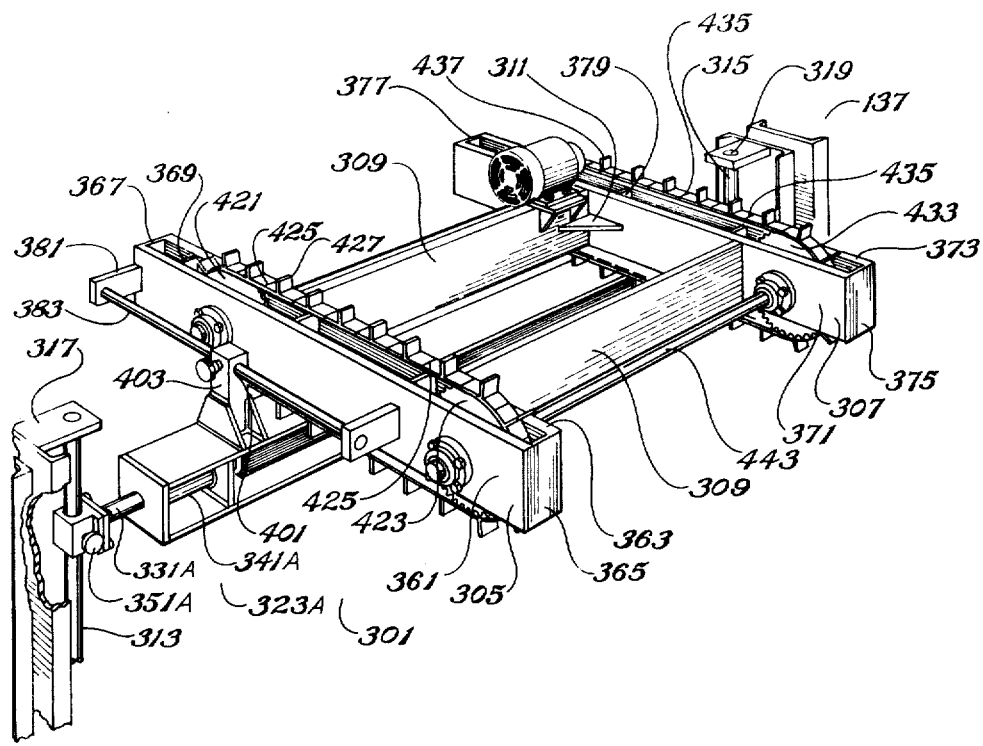
FIG. 27 is a perspective view of a single frame of the pipe feeder of the present invention.

The automatic feeder 301 comprises a frame 303 that rests on the top row of pipe of the stack and is coupled to the stanchions 135 and 137 such that it may be moved down or up if pipe is being removed from the stack or loaded thereon. In FIG. 27, the frame 303 is shown resting on the row of pipe 147P of the rack 27. The frame 303 also can be moved horizontally to the right or left, as shown in FIG. 27, relative to the plane of the stanchions 135 and 137 and relative to the pipe. In FIG. 27, the frame 303 is shown in a mid position relative to the plane of the stanchions. The frame 303 also can be swiveled or rotated relative to the stanchions as shown in dotted form in FIG. 29.

The frame 303 comprises two arms 305 and 307 which are fixedly attached together by cross beams 309 and gussets 311. Two vertical rods 313 and 315 are fixedly attached to the stanchions 135 and 137 respectively by top and bottom ears illustrated at 317 and 319. The bottom ears 317 and 319 are not shown. The rods 313 and 315 are parallel to the stanchions and are spaced therefrom by the ears 317 and 319. The rods 313 and 315 extend along the entire lengths of the stanchions 135 and 137. The two arms 305 and 307 are coupled to a structural support member 321 which extends between the two stanchions 135 and 137. Structural support member 321 has swivel end members 323A and 323B coupled to its opposite ends. End members 323A and 325B have apertures 327A and 327B which freely receive the rods 313 and 315 whereby the structural member 321 and hence the frame 303 may be moved upward or downward along the stanchions with the rods 313 and 315 acting as guides.

Figure 28:
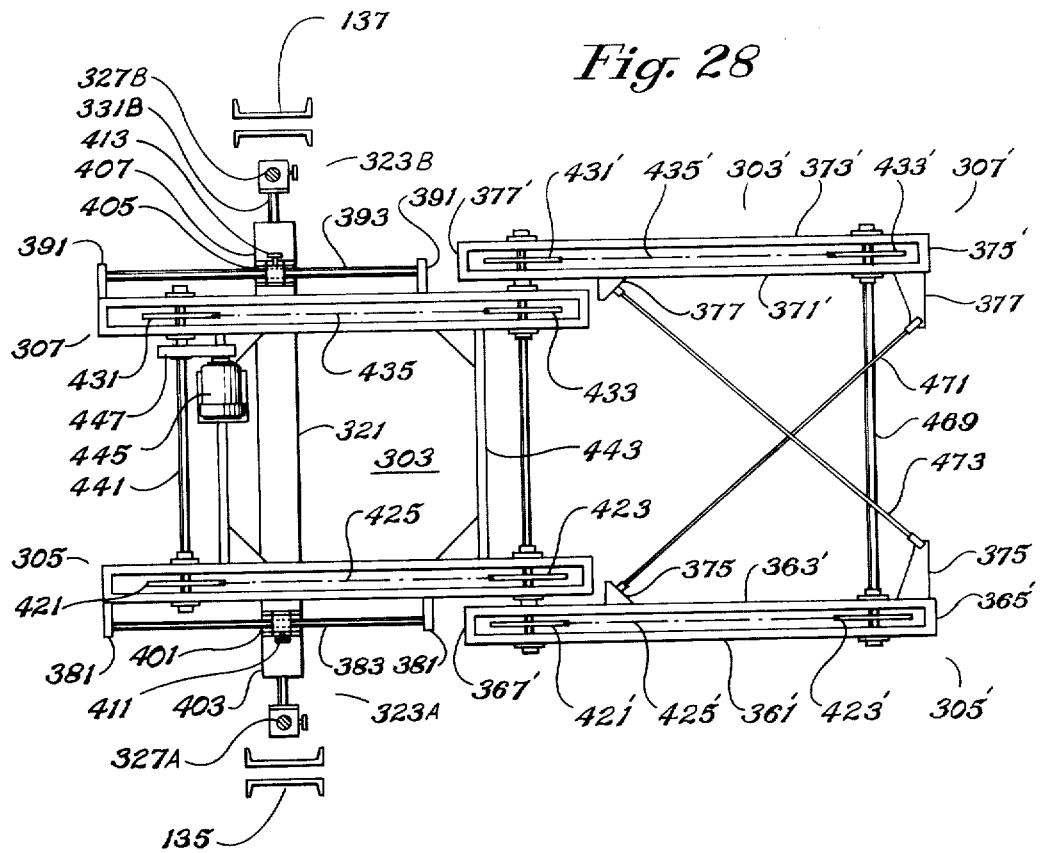
FIG. 28 is a top view of the frame of FIG. 27 with a second frame added.

Referring to FIGS. 27, and 34–36, the swivel end member 323A will be described in detail. Swivel end member 323B is identical to swivel end member 323A. End member 323A comprises a rod 331A which extends freely through apertures 333A and 335A formed in plates 337A and 339A and freely through cylinder 341A which is connected to plates 337A and 339A. Plates 337A and 339A are secured to structural member 321. A nut 343A is threaded to the inner end of rod 331A to prevent the rod 331A from moving axially out of plates 337A and 339A and cylinder 341A. The outer end of rod 331A has a flange 345A secured thereto which is bolted to a block 347A by bolts 349A. Aperture 327A is formed through block 347A for freely receiving the guide rod 313. A knob 351A having a threaded shaft may be threaded into block 347A to engage the guide rod 313. In FIG. 28, the rod, block, and knob of swivel member 323B are identified at 331B, 347B and 351B respectively. The purpose of the knobs 351A and 351B is to clamp the structural member 321 and hence the frame 303 to the guide rods 313 and 315 at a desired level. The structural member 321 and hence the frame 303 can rotate or swivel about the rods 331A and 331B as will be described subsequently.

Arm 305 is formed of two side members 361 and 363 having members 365 and 367 attached to their ends and a plurality of spaced cross braces 369 attached to the members 361 and 363 between end members 365 and 367. Arm 307 is constructed in a similar manner and is formed of two side members 371 and 373 having members 375 and 377 attached to their ends and a plurality of cross braces 379 attached to the members 371 and 373 between end members 375 and 377. Tabs 381 are attached to side member 361 of arm 305 to which is attached a rod 383. Similarly tabs 391 are attached to side member 373 of arm 307 to which is attached a rod 393. Rod 381 is freely received in an aperture 401 formed through block 403 which is attached to the top of structural member 321. Rod 391 is freely received in an aperture 405 formed through block 407 which is attached to the top of structural member 321. Thus the arms 305 and 307 and hence frame 303 can be moved horizontally forward across the top row of pipe or rearward away from the top row of pipe. Knobs 411 and 413 with threaded shafts are threaded into blocks 403 and 407 to engage the rods 383 and 393 to secure frame 303 in a desired horizontal position relative to the stanchions and the stack of pipe.

Each of the arms 305 and 307 supports two sprockets and an endless chain to which feet are attached for moving the pipe on the top row of the stack. The sprockets of arm 305 are identified at 421 and 423. An endless chain 425 extends around the sprockets and feet 427 are attached to the outer side of the chain. The sprockets of arm 307 are identified at 431 and 433. An endless chain 435 extends around the sprockets and feet 437 are attached to the outer side of the chain. Sprocket 421 and 433 are fixedly secured to a shaft 441 which extends through arms 305 and 307. Sprockets 423 and 433 are fixedly secured to a shaft 443 which extends through arms 305 and 307. In FIG. 28, the shaft 443 is longer than that shown in FIG. 27 in that its ends extend beyond arms 305 and 307 for coupling to additional arms as will be described subsequently. A motor 445 carried by the frame 303 has its shaft coupled to the shaft 441 by a belt 447 and pulleys (not shown) for rotating the shaft 441 in either direction.

As the shaft 441 is rotated, sprockets 421 and 431 are rotated together to drive chains 425 and 435 in unison. The structural member 321 is clamped with knobs 351A and 351B at a level such that the frame 303 including the chains 425 and 435 rest on and are supported by the top row of pipe. The frame 303 is moved forward such that the frame 303 extends completely across the top of the stack of pipe. The feet 427 and 437 are in alignment with each other. They have a length and are spaced apart on their chains such that when the frame 301 is supported by the top row of pipe the feet will fit partially between the pipe on the top row of the stack. Thus when the motor 445 is driven in one direction, the chains 425 and 435 will be driven in a direction to cause the feet 427 and 437 to move the pipe away from the stanchions 135 and 137 off of the top row of the stack to the lugs 121. When the motor 445 is driven in an opposite direction, the chains 425 and 437 will be driven in a direction to cause the feet 427 and 437 to move the pipe placed on the top row of the stack toward the stanchions 135 and 137.

The gates 211 may not be employed when using the automatic feeder 301 since the feet 427 and 437 will hold the pipe to prevent it from rolling off of the top row. The feeder 301 will operate in the following manner when transferring pipe to the trough 31. The arms 51 and 53 will be moved to locate their lugs at the level of the top row of pipe. The motor 445 will be actuated to cause the chains 425 and 435 to be driven in a direction to cause their feet 427 and 437 to move a length of pipe onto the lugs. The motor then will be stopped. That pipe will be transferred to the trough. The process will be repeated until the last pipe on the top row is transferred to the lugs. The end of the frame opposite structural member 321 then will drop down to the next lower row of pipe. The rails resting on the next lower row will be removed and the knobs 351A and 351B loosened to allow the structural member 321 and hence the rear of the frame to move down whereby the frame now is resting on that row. The knobs 351A and 351B will be tightened and pipe removed from the row on which the frame is resting.

The distance between the centers of sprockets 421 and 423 and 431 and 433 is such that the centers of sprockets 431 and 433 will be above the edge of the stack of pipe opposite the stanchions 135 and 137. When transferring pipe from the trough 31 to the rack the automatic feeder will operate in the following manner assuming that the top row of the stack is above the level of the catwalk 63. The rails will be located on the top row of pipe and the structural member 321 moved upward above the top row to place the rear of the chains 425 and 435 above the top row a distance corresponding to the diameter of pipe to be loaded on the top row. The end of the frame 303 opposite the structural member 321 will rest on the top row of the stack. As the pipe is moved upward by the lugs 121, the pipe will engage the lower sides of the chains 425 and 435 and move the end of the frame opposite structural member 321 upward off of the top row. The motor 445 will be actuated to cause the chains to be driven in a direction whereby the feet 427 and 437 will move the pipe off of the lugs onto the top row at which point the motor 445 will be stopped. The arms 51 and 53 will move down to pick up another length of pipe and the process repeated until the row is filled with pipe. The structural member 321 will again be moved upward and the process repeated for the next row. If the top row of the stack is below the level of the catwalk 63, the forward end of the frame may be temporarily tilted up to allow the lugs 121 and pipe carried thereby to pass below the forward ends of the arms 305 and 307 whereby the chains of the arms may be driven to unload the pipe from the lugs 121 onto the top row of the stack. When the forward end of the frame is tilted up, its rear end swivels about rods 331A and 331B. In the alternative, knobs 411 and 413 may be loosened and the frame 303 slid rearward to allow the lugs 121 and pipe carried thereby to pass below the forward ends of the arms 305 and 307. The frame 303 then will be moved forward; the knobs 411 and 413 tightened; and the chains of the arms driven to unload the pipe from the lugs 121 onto the top row of the stack.

Figure 30:
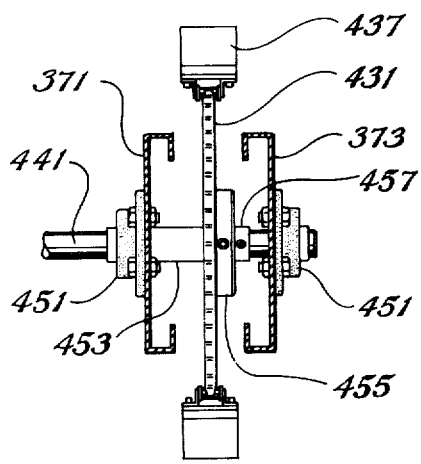
FIG. 30 is a cross-sectional view of one of the arms of the frame of FIG. 7 illustrating one of its sprockets.

FIG. 30 illustrates the manner in which a sprocket is attached to its shaft. Members 451, and bearings, member 453 is a spacer, member 455 is a collar attached to the sprocket which in turn is attached to the shaft and member 457 also is a collar attached to the shaft 441.

FIGS. 30-33 illustrate more detail of the feet attached to the chains. Chain 435 and feet 437 are illustrated. The links of the chains have L-shaped members 459 connected to each side. Each foot 437 is a T-shaped member with its base attached to the L-shaped members of several links by bolts 461. Member 463 is a back up plate. The feet 427 are attached to the chain 425 in a similar manner. The feet may be formed of hard rubber, plastic, or metal.

Figure 31:
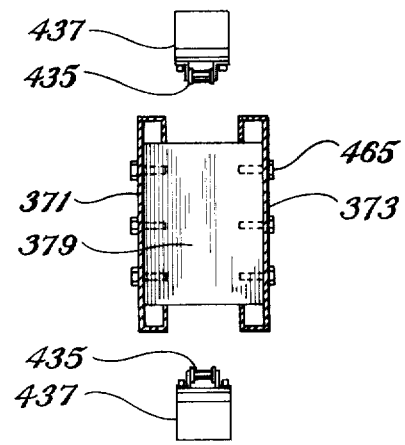
FIG. 31 is a cross-sectional view of one of the arms of the frame of FIG. 27 illustrating a cross support.

FIG. 31 illustrates a cross-section of arm 307 showing its cross-braces 379 connected to sides 371 and 373 with bolts 465. The bolts are not shown in FIG. 27 for purpose of clarity.

Figure 29:
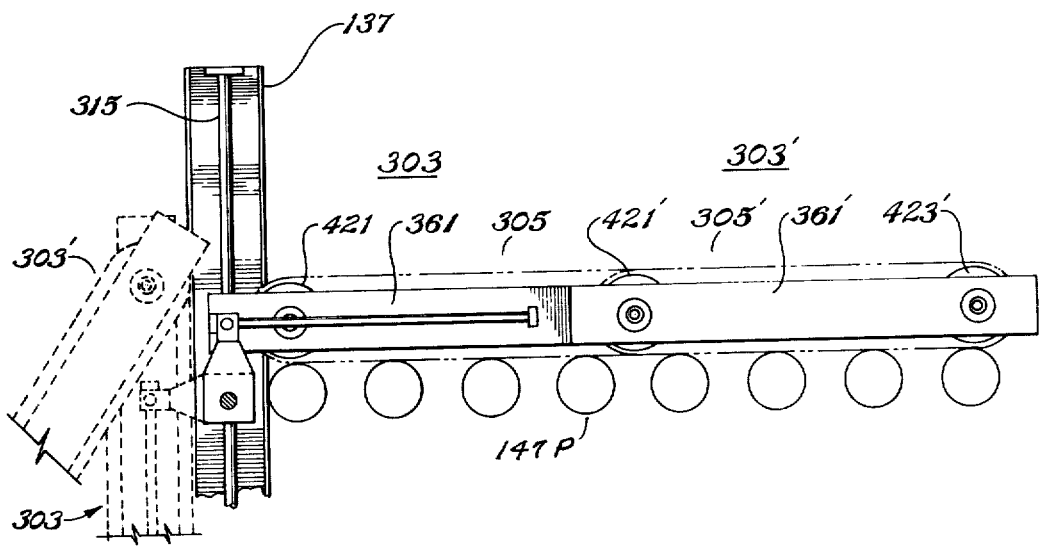
FIG. 29 is a partial side view of the two frames of FIG. 28.

In order to allow a module 251 of pipe to be removed from the rack or placed thereon, the structural member 321 of frame 303 may be rotated or swiveled 90° counterclockwise as seen in FIGS. 29 and 36 to move the arms 305 and 307 out of the way of the rack to provide room for removal or placement of a module 251 of pipe. In FIG. 29, the rods 383 and 393 of arms 305 and 307 have been allowed to slide downward through their blocks 403 and 407. Thus the frame 303 has been moved downward relative to structural support member 321.

Preferably the automatic feeder 301 is constructed in sections as shown in FIGS. 28 and 29. Frame 303 comprises one section and another section comprising arms 305' and 307' form a second section 303'. Arm 305' is identical to arm 305 and arm 307' is identical to arm 307. In this respect, arms 305' and 307' each support two sprockets and an endless chain to which feet are attached for moving the pipe on the top row of the stack. The components of arms 305' and 307' are distinguished from the components of arms 305 and 307 by the use of prime symbols. In the embodiment of FIG. 28, the shaft 443 is longer than that shown in FIG. 27. In the embodiment of FIG. 28, sprockets 421' and 431' are splined or keyed to the shaft 443 such that they rotate together with shaft 443 as it is turned by sprockets 423 and 433. Sprockets 423' and 433' are splined or keyed to a shaft 469. The arms 305' and 307' are secured together by cross braces 471 and 473. Two tabs 475 are connected to inner arm structure 363' and two tabs 477 are connected to inner arm structure 371'. The cross brace 471 is removably connected to two of the tabs 475 and 477 as shown and the cross brace 473 is removably connected to the other two tabs 475 and 477. The distance between shafts 441 and 443 is the same as the distance between shafts 443 and 469. For use with modules 251 having 7½ feet rail sections, the distance between shafts 441 and 443 will be 7½ feet and the distance between shafts 443 and 469 will be 7½ feet. When motor 445 is operated, chains 425, 425', 435, and 435' all will be driven in the same direction in unison.

In use, the frame section 303 of the feeder will rest on the top row of the left module 251 next to the stanchion 135 and 137 and the frame section 303' will rest on the top row of the right module 251. The automatic feeder comprising the frame sections 303 and 303' will operate in the same manner as described above in connection with frame 303 in removing pipe from the top row of the stack onto the lugs 121 or feeding pipe from the lugs 121 onto the top row of the stack.

If one wants to remove the right module 251, the frame section 303' may be moved upward relative to frame section 303 out of the way. This can be done since sprockets 423' and 433' are free to turn relative to sprockets 421' and 431' as they are held stationary. If both the right and left modules 251 are to be removed, both of sections 303 and 303' may be rotated or swiveled counterclockwise out of the way as shown in dotted form in FIG. 29.

I claim:

1. A device for moving lengths of pipe off of or onto rows of stacked pipe comprising:
a pair of stanchions secured in place in spaced relation, said stanchions defining a plane generally parallel to the lengths of stacked pipe,
a horizontal beam member extending between said stanchions and connected at either ends to said stanchions by connecting means,
said horizontal beam member having a longitudinal axis,
said connecting means allowing said horizontal beam member to have vertical movement and to turn about an axis extending between said stanchions,
said horizontal beam member having a length shorter than the distance between said stanchions,
a rod means having said turning axis extending axially from the ends of said horizontal beam member to said connecting means,
a frame structure mounted to said horizontal beam member by mounting means,
said mounting means allows said frame structure to be moved in a direction generally perpendicular to said longitudinal axis of said horizontal beam member,
a pair of endless belt means attached to said frame structure, positioned generally perpendicular to said plane and adapted to rest across at least a portion of a row of pipe,
said mounting means being independent of said endless belt means,
a feet means attached to each said endless belt means and adapted to engage the pipe on which said endless belt means is positioned and to move the pipe toward or away from said pair of stanchions, and
a drive means for driving said pair of endless belt means in unison in first or second directions for moving the pipe on which said pair of endless belt means rests toward or away from said pair of stanchions.

2. The device according to claim 1 wherein,
said connecting means includes a pair of upright guide means coupled to said pair of stanchions respectively, and a coupling means for coupling said horizontal beam member to said guide means for vertical movement of said horizontal beam member, and thus said frame structure, to different levels along said upright guide means,
said guide means includes a pair of bars mounted vertically to said pair of stanchions respectively, and
said pair of bars and said turning axis lie in the same vertical plane.

3. The device according to claims 1 or 2 wherein,
said pair of endless belt means is adapted to extend through said plane.

4. The device according to claim 3 wherein, said mounting means includes a pair of horizontal bars each mounted on opposing sides of said frame structure and a pair of vertical members attached to said horizontal beam member, each said vertical member having an opening adapted to slidingly receive its corresponding bar therethrough, whereby said frame structure can be positioned relative to said horizontal beam member, and a fixing means attached to each said vertical member for fixing each said bar at a selected position to each said vertical member.

5. The device according to claims 1 or 2 wherein, said drive means includes a motor carried on said frame structure, said motor having an output shaft, each said endless belt means includes a pair of sprockets rotatably mounted to said frame structure and belt, each said belt reeving about one pair of said sprockets,
said output shaft being drivingly connected to one of said sprockets, and
said drive means further including a shaft for connecting opposed sprockets of said pair of endless belt means.

6. The device according to claim 1 wherein, said pair of endless belt means defines a first pair, said frame structure defines a first frame structure, each said belt means of said first pair including two sprockets around which each said endless belt means turns,
a first shaft connecting opposing sprockets of said first pair of endless belt means,
a second shaft connecting the other two opposing sprockets,
said second shaft being adapted to extend over the top row of pipe,
said drive means being connected to said first shaft,
a second frame structure connected to said first frame structure,
a second pair of endless belt means connected to said second frame structure and adapted to extend in a direction generally perpendicular to said plane and adapted to rest across at least a portion of the top row of pipe,
each said second endless belt means including a feet means adapted to engage the pipe on which said second pair of endless belt means rests and to move the pipe toward or away from said pair of stanchions depending upon which direction said second pair of endless belt means is driven by said drive means, and
a pair of sprockets for each endless drive means of said second pair around which said endless belt means of said second pair respectively is adapted to turn,
said second shaft connecting the two opposing sprockets of said second pair whereby said first and second pairs of endless belt means are driven together in unison in the same direction when said drive means drives said first pair of endless belt means.

7. The device according to claim 6 wherein, said second frame structure is adapted to turn about said second shaft when said first frame structure is held stationary whereby the ends of said second pair of belt means opposite said second shaft and hence the end of said second frame structure opposite said second shaft may move upward at an angle relative to said first frame structure.

8. The device according to claim 6 wherein, said connecting means includes a pair of upright guide means coupled to said pair of stanchions respectively, and a coupling means for coupling said horizontal beam member to said guide means for vertical movement of said horizontal beam member, and thus said first frame structure, to different levels along said upright guide means.

9. The device according to claim 8 wherein, said guide means includes a pair of bars mounted vertically to said pair of stanchions respectively.

10. The device according to claims 6 or 8 wherein, said mounting means includes a pair of horizontal bars each mounted on opposing sides of said first frame structure and a pair of vertical members attached to said horizontal member, each said vertical member having an opening adapted to slidingly receive its corresponding bar therethrough, whereby said first frame structure can be positioned relatively to said horizontal beam member, and a fixing means attached to each said vertical member for fixing each said bar at a selected position to each said vertical member.

11. The device according to claims 6 or 8 wherein, said drive means includes a motor carried on said first frame structure.

12. The device according to claim 6 wherein, said pair of bars and the longitudinal axis of said horizontal member lie in the same vertical plane.

13. The device according to claim 6 wherein, said first pair of endless belt means is adapted to extend through said plane.

* * * * *